United States Patent [19]

Cedergren

[11] 4,273,478

[45] Jun. 16, 1981

[54] LOCKING SECURITY CONTAINER

[76] Inventor: Stig Cedergren, c/o Robsahm, Strindbergsgat. 53, S-115 31 Stockholm, Sweden

[21] Appl. No.: 893,980

[22] Filed: Apr. 6, 1978

[30] Foreign Application Priority Data

Apr. 12, 1977 [SE] Sweden ................................ 7704195

[51] Int. Cl.³ .............................................. B65G 51/06
[52] U.S. Cl. ........................................ 406/189; 109/25
[58] Field of Search ........................ 243/36, 38, 39, 32, 243/33, 34, 35, 19, 25, 26, 27, 28; 109/25, 29; 406/184–190; 169/28; 222/180

[56] References Cited

U.S. PATENT DOCUMENTS

| 992,823 | 5/1911 | Stoddard | 406/90 |
|---|---|---|---|
| 1,606,516 | 11/1926 | Daly | 109/25 |
| 1,646,687 | 10/1927 | Daly | 109/25 |
| 2,016,946 | 10/1935 | Scanlan | 406/30 |
| 2,035,498 | 3/1935 | Navis et al. | 109/25 |
| 2,384,826 | 9/1945 | Ferguson | 109/25 |
| 3,263,943 | 8/1966 | Share et al. | 406/151 |
| 3,559,593 | 2/1971 | Munton et al. | 109/25 |
| 3,613,794 | 10/1971 | Naumann et al. | 169/28 |

FOREIGN PATENT DOCUMENTS 997162 7/1965 United Kingdom ...................... 109/25

Primary Examiner—James L. Rowland
Attorney, Agent, or Firm—Birch, Stewart, Kolasch & Birch

[57] ABSTRACT

A lockable security container for the transportation of valuables and including means for damaging valuables positioned within the container comprising: a container including an internal space for positioning valuables, means for damaging the valuables positioned within said internal space including a housing positioned within said internal space for containing a dye; said housing including a plunger interposed between a charge of powder and said dye; said charge of power being operatively connected to said container to activate said charge when said container is subjected to unauthorized tampering, activation of said charge moves said plunger against said dye to uniformly spray said internal space and damage said valuables.

8 Claims, 4 Drawing Figures

LOCKING SECURITY CONTAINER

BACKGROUND OF THE INVENTION

To transport the day's takings, consisting of banknotes and the like, from shops to the night safe of a bank, it is a known practice to use simple leather bags or plastic tubes ("cartridges"). Both cartridges and night safes are very unsatisfactorily designed from the point of view of security, and a criminal today has many opportunities of obtaining the valuable contents in a variety of ways. Bank messengers are frequently attacked, as the cartridges are all too easily rifled of their contents, and the safes can be either blasted open or pulled out of the wall. Similarly a vehicle, may be broken open and emptied. Moreover, attacks on bank messengers and night-safe robberies have recently shown a marked tendency to increase, and the police, the Swedish Bank Inspection Board, and other institutions are desperately seeking for ways of overcoming the security problems. To this end, efforts are being made to improve existing arrangements, efforts which are mainly concentrated on strengthening the night safes in various ways. Experiments have also been made with systems whereby the valuables are dyed if the night safe is subjected to violence. Hitherto it has not been possible to make cartridges of such secure construction that they lose their attraction as objects of theft.

As a result of all the difficulties in the way of protecting valuables, the Swedish Bank Inspection Board is seriously considering measures which would involve restrictions on the services offered by banks, and which would naturally be to the disadvantage of the public.

SUMMARY OF THE INVENTION

The principal objective of the invention is, accordingly, a system capable of eliminating the risks associated with the transportation of valuables to bank safes. This is achieved, in the invention, by means of a locking security container, incorporating means for the destruction or marking of the contents, the means being designed to be activated if the locked container is subjected to violence or to conditions for which it is not intended, or when no activation thereof occurs for a long period. A security container of this type should considerably reduce the number of attacks on bank messengers, as the contents of the container will no longer be available to the robbers. By the use of a pneumatic tube conveyor system, adapted to suit the preferably cylindrical container, the latter can moreover be conveyed into the interior of the bank premises, where it can be made inaccessible to robbers. The pneumatic tube system, if such is used, comprises an external door with an electrically controlled locking mechanism inaccessible from the outside and designed to be triggered by electrical pulses generated from the outside by manual operation of a coding means located near the door. The coding means will appropriately consist of a key set, and pulses generated by operation of the coding device may also control the position of a blocking bar that can be introduced into the pneumatic tube.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following paragraphs the invention will be described in closer detail in the form of an example of embodiment with reference to the following drawings, similar components in the different figures being provided with the same reference number.

DETAILED DESCRIPTION OF THE INVENTION

Figure 1:
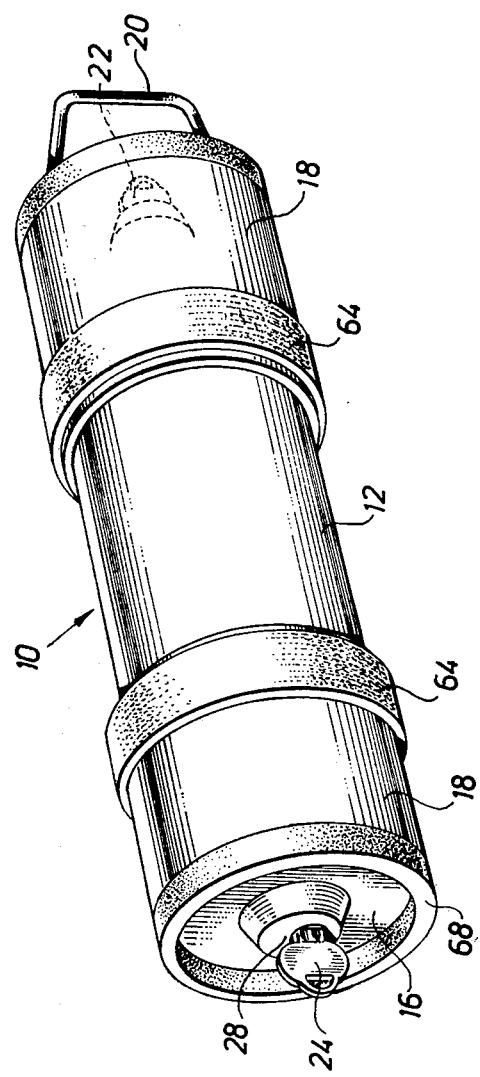
FIG. 1 is a perspective view of a security container designed in accord with the invention.

In the embodiment of the invention illustrated and presented herein, the new, locking security container 10 comprises a thin outer tube 12 of high-alloy steel or other material that is difficult to break open or drill through. At either end of the tube 12 there is a cap 14, 16, each cap being provided with a peripheral flange 18 that projects down round the respective end of the tube 12. The flanges 18 are preferably welded onto the respective caps 14, 16 and, like the caps, may be of the same material as the tube 12. One of the caps 14, 16 illustrated in FIG. 1 is fitted with a carrying handle 20 by means of which the security container 10 can be conveniently held and transported. Both caps 14, 16 are provided with a locking mechanism. The purpose of this is that one of the caps, preferably the one with the carrying handle 20, shall be locked and unlocked by means of the customer's key 22, while both caps shall be locked and unlocked by means of a masterkey 24 kept at the bank. Possibly, the two lock mechanisms may be related, in a known manner, so that after the container 10 has been locked with the customer's key 22, it must be unlocked once with the masterkey 24 before the customer's key 22 can be used again. Except for the carrying handle 20, the keys 22, 24, and the detailed design of the respective lock mechanisms, the two caps 14, 16 are identical. The outer end of the keyhole 26 passes through a deep-hardened plate 28 which is rotatably mounted, so that if a drill, for instance, is used in an attempt to meddle with the keyhole of the lock cylinder 30, the said plate will rotate with the drill. The keyhole is sealed at the bottom. The lock used may be of standard or special type, and two of the pins of the lock cylinder 30 may be provided with a core of hard metal, which will deflect a drill if any attempt is made to drill through the lock. Further, the rear of the lock cylinder may be fitted with two spring-loaded pins to lock the whole mechanism if it is attempted to drill through or pick the lock. The said mechanism also comprises four positively located, hardened bolts 32, arranged to be actuated by an arm via corresponding helical springs 34. The bolts 32 can be moved back and forth in corresponding, shielded holes 35 in the outer wall of the container 10. When locked, the bolts will thus be in contact with the inside of the flange 18 of the cap 14, 16.

A power circuit or electrical circuit consisting of a relatively sensitive, electrically conducting, enameled copper wire 36 that withstands temperatures up to approximately 70° C., is provided within all surfaces of the container 10 to screen off the compartment of the latter intended for valuables. The enameled wire 36 is preferably glued to the inner wall of the container 10 by means of a two-component glue. The electrical circuit includes a first portion wherein the enameled wire 36 is wound in the form of a helix on the inner wall of the tube 12 and arranged to include a second portion in the form of a flat coil or a dense mesh on the inside of the caps 14, 16. Since the turns of the enamel wire 36, in the design referred to, lie in close contact with each other, any violence to the container 10 will immediately result in a shortcircuit in the wire 36, or in an interruption of the current supplied to the enameled wire 36 from a battery unit 38, comprising one or more batteries, located in each cap. The battery unit 38 is preferably rechargeable and may be equipped with a charge indicator (not illustrated), so that the unit can easily be replaced or recharged when necessary. The output of the battery unit 38 may be quite low, as the current flowing in the power circuit consists of a very weak standing current.

A plastic tube 40 is provided to serve as a guard between the helically wound enameled wire 36 and the interior of the tube 12. The plastic tube is provided with matching holes 42 opposite the holes for the bolts 32 in the tube 12.

To connect the enameled wire on the inside of the tube 12 and the enameled wire on the inside of each of the caps 14, 16, a loop of wire 97 is provided, running parallel with a wire rope 44 in a plastic tube 46 to prevent damage to the wire 97 when the cap 14 or 16 is removed.

Inside the cap 14 is a battery or a dischargeable capacitor 48, which is a component of a supervisory circuit and is triggered instantaneously if the current flow in the power circuit formed by the enameled wire 36 is improperly broken or shortcircuited. The power source 48 of the supervisory circuit should be of greater capacity than the power circuit battery unit 38, if such is used, and should preferably be replaced when there is reason to believe its energy has been reduced (the last date for use is generally indicated on the battery), so as not to jeopardize the proper functioning of the device. When the energy source 48 of the supervisory circuit is switched in, it activates a fuse head 52, which is of conventional type, containing a small coil filament, and which is located at the rear of a short cylinder or housing 50.

The said cylinder 50 contains, besides the above-mentioned fuse head 52, a plunger 54 that can be forced down inside the cylinder 50. In front of the plunger 54 is a quantity of fine-pigment dye 56, consisting, for example, of thin spirit dye, and at the forward end of the cylinder 50 there are a number of fine holes 58 so designed that the dye cannot pass out of the cylinder 50 unless the plunger 54 is actuated. In contact with the fuse head 52 behind the plunger 54 there is a charge of powder 60. Activation of the fuse head 52 causes a relatively slow combustion of the powder, so that the plunger 54 is forced slowly forward in the cylinder 50 at a constant rate, in the process uniformly forcing out the dye through the holes 58. The dye 56 will then mark the valuables (not illustrated), such as bundles of banknotes, contained in the central part of the container 10. A wire bow 62 attached to the relevant cap 14 is used as a spacing element and note holder to keep the valuables at a suitable distance from the holes 58 in the cylinder 50 to be sprayed with the dye.

At the base of each of the caps 14, 16, when in place on the container, is a sealing ring 64 encircling the circumference of the tube 12. The sealing rings 64 are somewhat thicker than the flanges 18, so that the ring 64 will effect a satisfactory seal in a pneumatic conveyor tube 66 designed for the security container 10. On the exterior of the cap 16 not fitted with a handle there is also an impact damper 68, which protects the container 10 against violent impacts inside the conveyor tube 66. The impact damper 68, which may be of rubber, projects beyond the plate 28 on the cap.

Figure 3:
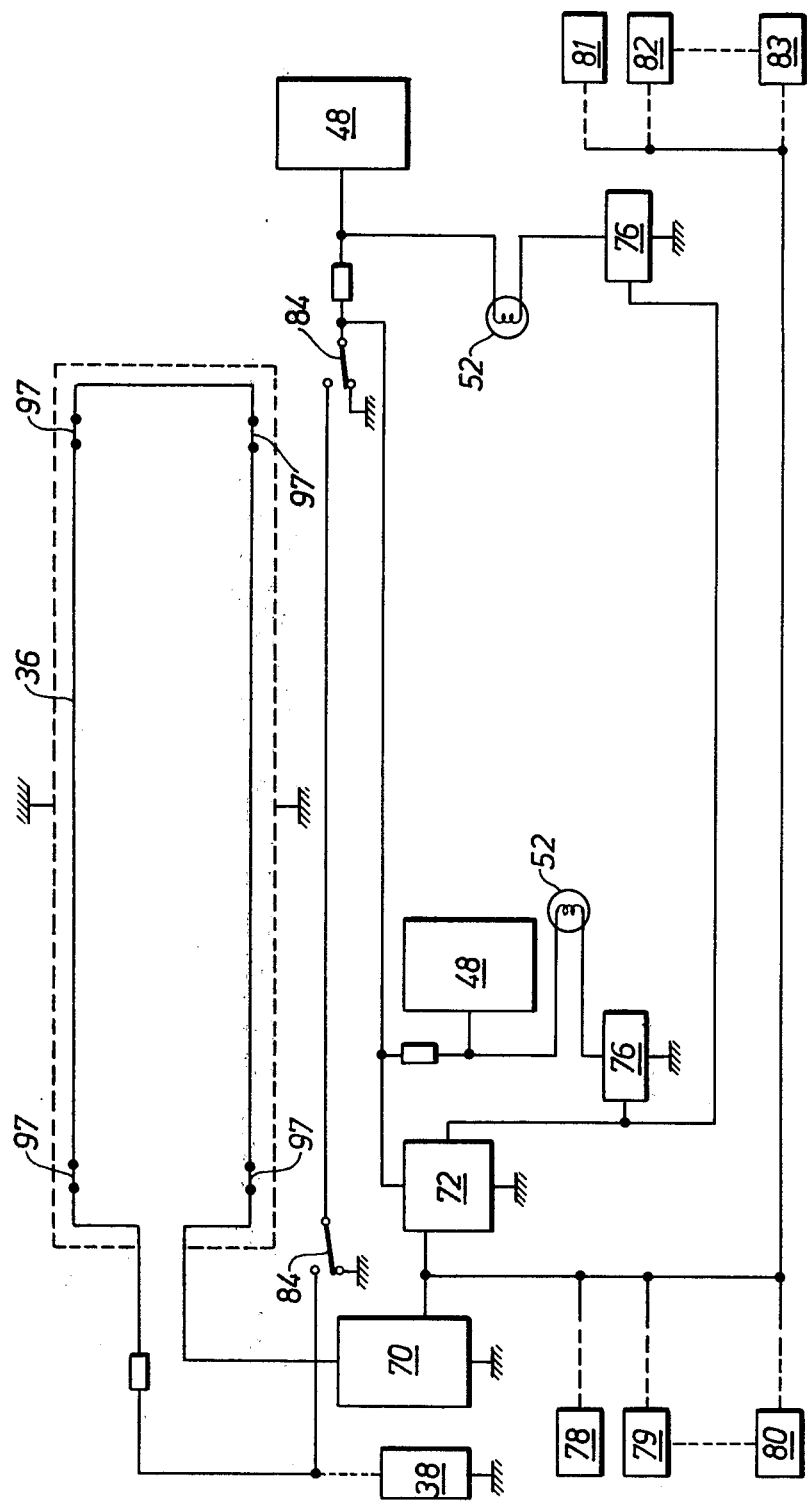
FIG. 3 is a diagram of the electrical circuit inside the security container illustrated in FIGS. 1 and 2.

The circuit diagram of FIG. 3 shows schematically the electrical set-up inside the security container 10. Located in one of the two caps 14, 16 of the container 10 is the battery unit 38, connected to a device 70 having a reference voltage which may be adjusted within certain limits. The reference voltage device 70, in its turn, is connected to a level detector 72 designed to react to a pre-set threshold value of the reference voltage.

FIG. 3 shows the security loop intended to be set up between the battery unit 38 and the reference voltage device 70, which loop consists of the enameled wire 36 and the connecting wires 97 at the caps 14, 16. The metal parts enclosing the security loop, such as the container 10 and the caps 14, 16, are in electrical contact with the earth potential of the supervisory system.

In each cap 14, 16 there is further an energy source 48, being part of the supervisory circuit and consisting of the previously mentioned battery element or capacitor element, each of which is switched in by its electronic switch 76 when the reference voltage reaches the threshold value. The fuse head 52 is thereby activated and the powder charge 60 detonated.

Besides the level detector 72, a number of additional detectors 78–83 may be connected to the reference voltage device 70, which are also capable of activating the battery or capacitor element 48 of of the supervisory circuit in a manner to trigger the detonation of the powder as above mentioned. The said additional detectors 78–83 may, for example, sense the presence of liquid inside the container 10, the temperature of the container, etc.

To eliminate the risk of accidental activation of the fuse head 52 while and after opening the container 10, the flange of each cap 14, 16 contains a microswitch 84 which, as the caps 14, 16 are removed, is triggered in a manner to disconnect the energy sources 48 of the supervisory circuit, and also the battery unit 38.

Figure 2:
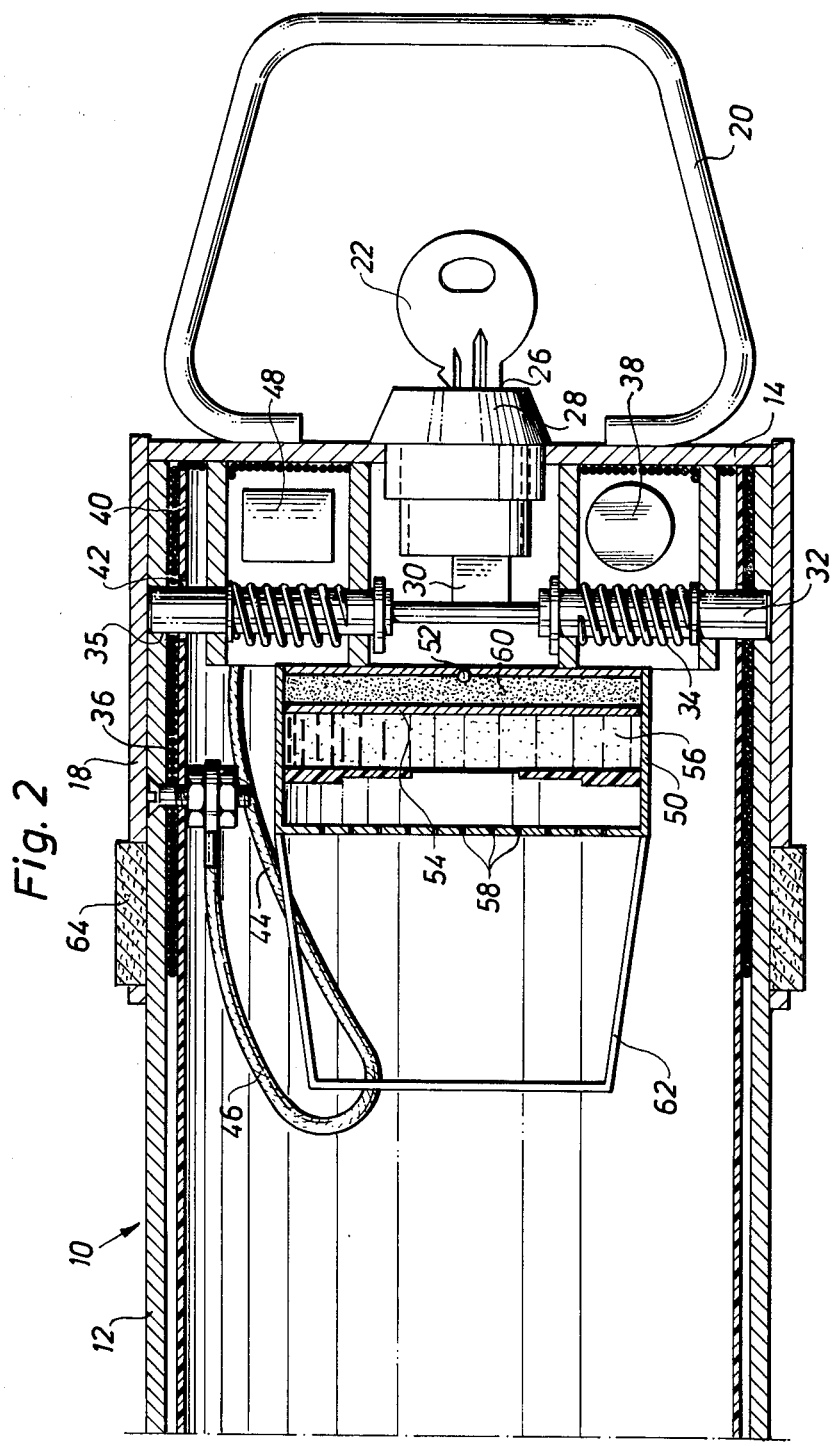
FIG. 2 is a vertical cross section, seen from the side, of one half of the security container illustrated in FIG. 1, which container is symmetrical about a vertical axis, with the exception of a handle shown in the drawing.
Figure 4:
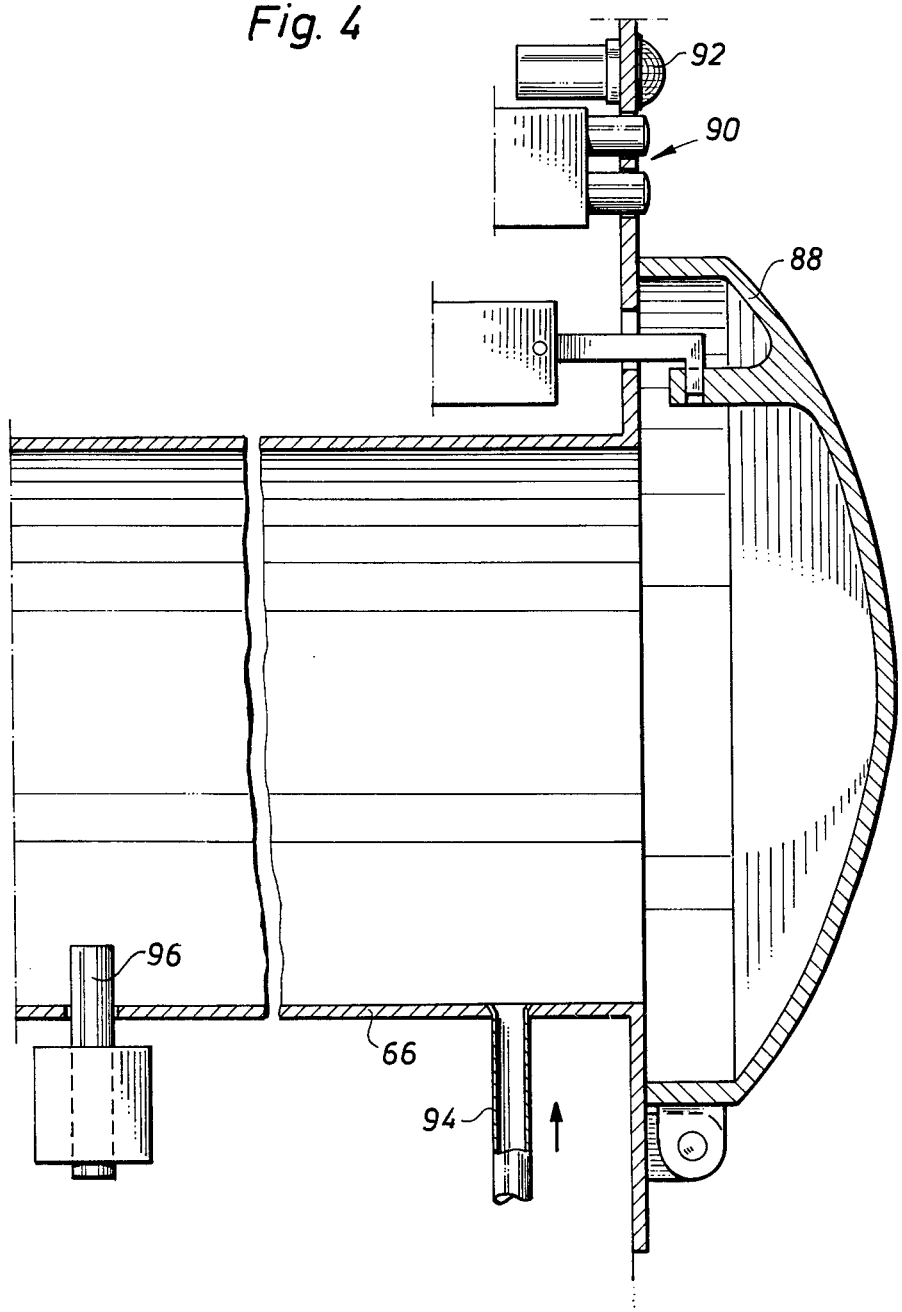
FIG. 4 is a vertical section through the exterior wall of a bank building, showing the pneumatic tube entering the said wall, and the components associated therewith.

FIG. 4 shows the external part of the tube 66 of a pneumatic tube system designed for conveying security containers 10 of the type shown in FIGS. 1 and 2. The pneumatic tube 66 enters the wall, e.g. of a bank building, and is fitted at its outside end with a locking door 88. The lock mechanism of the door 88 is electrically operated and so arranged as not to be accessible from the outside. The lock mechanism is designed to be controlled by electrical pulses generated by manual operation of a coding means 90 next to the door 88. In the present case, this means consists of a key set recessed in the wall. In the event of a power failure or failure of the tube system or associated equipment, a lamp 92 near the key set will light up, preferably showing red. Thus, if the lamp 92 is burning when a customer wishes to deposit a security container 10, the customer should go to another branch instead. The key set 90 may also include a key to generate a pulse which triggers the feeding of an ordinary standard plastic tube into the pneumatic tube 66 in the wall from a supply inside the bank. After the door 88 is opened, a conventional cartridge, envelope or other object may be placed in the plastic tube, which is then pushed in and the door closed. The plastic tube is then impelled down into the bank vault or similar room by air supplied in the direction of the arrow from the branch line 94. By this arrangement, old cartridges intended for the night safes currently in use can still be utilized.

The electrical pulses generated by operation of the coding means 90 are also intended to control the position of a blocking bar 96 that can be introduced into the pneumatic tube 66 through the wall of the latter at a certain distance from the opening thereof. The bar 96 is moved to one side as the door 88 is unlocked, and when in raised position prevents foreign objects being inserted into the pneumatic tube.

The new security arrangement for use in connection with the transporation of valuables to a room inside a bank or similar building offers many advantages. As described above, the security container is designed so that the valuables will be marked by dyeing immediately the container is subjected to violence from the outside, and the electrical set-up inside the container is so designed that the energy source of the supervisory circuit will be activated, not only in the event of an actual interruption of the current or comparable circumstances, but also when the capacity of the power circuit battery unit falls too low. Further, the battery unit of the power circuit should be dimensioned so that its capacity will not be appreciably affected by low temperatures. Moreover, the container is designed so that its performance remains unaffected by immersion in liquid.

It is naturally possible to modify the set-up described above within the terms of the idea of the invention. The security container need not, of course, necessarily be used in conjunction with the illustrated pneumatic tube conveyor system, but can also be conveyed in some other manner. Its shape may also be varied within wide limits, the position of the cap or caps perhaps being different.

I claim:

1. A lockable security container for valuables comprising:
   a container including a central body and a closure cap provided on at least one end thereof;
   said container including an interal space for positioning valuables;
   said internal space being defined between an inner wall of said central body and end walls of said container;
   an electrical circuit including a first portion substantially covering the entire inner wall of said central body;
   said electrical circuit including a second portion substantially covering the entire end walls of said container;
   said first and second portions of said electrical circuit being operatively connected to each other and to a power source;
   means for damaging the valuables positioned within said container including a housing positioned within said internal space for containing a dye;
   said housing including a plunger interposed between a charge of powder and said dye; and
   said charge of powder being operatively connected to said electrical circuit and said power source thereby shortcircuiting said electrical circuit activates said charge of powder to move said plunger against said dye to uniformly spray said internal space and damage said valuables.

2. A lockable security container for valuables according to claim 1, wherein said electrical circuit comprises an enameled wire wound in a helical form within said central body and arranged in a dense mesh on the end walls of said container.

3. A lockable security container according to claim 2, wherein a guard is operatively positioned to protect said enameled wire positioned within said central body from valuables positioned therein.

4. A lockable security container according to claim 1, wherein said housing includes a spacer means to space said valuables from said dye and plunger.

5. A lockable security container according to claim 4 wherein said spacer means is a wire bow.

6. A lockable security container according to claim 1, wherein said container is a tubular container.

7. A lockable security container according to claim 1, wherein said closure cap includes a carrying handle.

8. A lockable security container according to claim 6, wherein said tubular container includes one or more sealing rings encircling the outer surface thereof and at least one of said end walls being provided with an impact damper.

* * * * *